(12) United States Patent
Wickboldt (10) Patent No.: US 11,017,200 B1
(45) Date of Patent: May 25, 2021

(54) COLLIMATOR FOR UNDER-DISPLAY OPTICAL FINGERPRINT SENSING

(71) Applicant: OmniVision Technologies, Inc., Santa Clara, CA (US)

(72) Inventor: Paul Wickboldt, Walnut Creek, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 16/776,060

(22) Filed: Jan. 29, 2020

(51) Int. Cl.
*G06K 9/00* (2006.01)
*H04L 29/06* (2006.01)
*H04M 1/02* (2006.01)

(52) U.S. Cl.
CPC ...... *G06K 9/00046* (2013.01); *H04L 63/0861* (2013.01); *H04M 1/0272* (2013.01); *H04M 2250/12* (2013.01)

(58) Field of Classification Search
CPC .......... G06K 9/00046; H04L 63/0861; H04M 1/0272; H04M 2250/12
See application file for complete search history.

(56) References Cited

U.S. PATENT DOCUMENTS 10,410,037 B2 * 9/2019 He .................. G06K 9/00087

* cited by examiner

*Primary Examiner* — Brian K Young
(74) *Attorney, Agent, or Firm* — Lathrop GPM LLP (57) ABSTRACT

A collimator for under-display fingerprint sensing includes (a) a substrate having opposite facing first and second sides, (b) an array of microlenses disposed on the first surface for focusing light from a fingerprint surface onto a focal plane that is between the array of microlenses and the second side of the substrate such that the light, as projected by the array of microlenses, is diverging when exiting the second side of the substrate, and (c) an array of apertures between the array of microlenses and the substrate, wherein each of the apertures is aligned to and cooperates with a respective one of the microlenses to form a field-of-view-limited lens having a field of view corresponding to a respective local portion of the fingerprint surface.

18 Claims, 8 Drawing Sheets

FORM A PLURALITY OF COLLIMATORS ON A COMMON SUBSTRATE TO FORM A COLLIMATOR SHEET
1310

DEPOSIT, ON A FIRST SIDE OF THE SUBSTRATE THAT FACES AWAY FROM THE IMAGE SENSOR AFTER THE STEP OF BONDING, AT LEAST ONE APERTURE LAYER FORMING A PLURALITY OF APERTURE ARRAYS
1312

DEPOSIT A MICROLENS LAYER ON THE FIRST SIDE OVER THE APERTURE LAYER, WHEREIN THE MICROLENS LAYER INCLUDES A PLURALITY OF MICROLENS ARRAYS RESPECTIVELY POSITIONED OVER THE PLURALITY OF APERTURE ARRAYS
1314

DEPOSIT, ON THE FIRST OR A SECOND SIDE OF THE SUBSTRATE, A WAVELENGTH FILTER FOR BLOCKING INFRARED LIGHT AT LEAST IN A NEAR-INFRARED SPECTRAL BAND
1316

DICE THE COLLIMATOR SHEET TO SINGULATE AT LEAST ONE COLLIMATOR THEREFROM
1320

BOND A COLLIMATOR TO A LIGHT-RECEIVING SURFACE OF AN IMAGE SENSOR SUCH THAT A FOOTPRINT OF THE COLLIMATOR ON THE IMAGE SENSOR IS OVER AT LEAST A PORTION OF A PHOTOSENSITIVE PIXEL ARRAY OF THE IMAGE SENSOR, WHEREIN THE COLLIMATOR INCLUDES AN ARRAY OF LENSES EACH CONFIGURED TO COLLECT LIGHT FROM A RESPECTIVE LOCAL PORTION OF A FINGERPRINT SURFACE AND PROJECT THE LIGHT TO THE IMAGE SENSOR
1330

ADHERE THE COLLIMATOR TO THE IMAGE SENSOR WITH AN ADHESIVE
1332

BOND THE COLLIMATOR TO THE IMAGE SENSOR SUCH THAT THE ARRAY OF LENSES IS AT AN OBLIQUE ANGLE TO THE PHOTOSENSITIVE PIXEL ARRAY
1334

BOND THE COLLIMATOR TO THE LIGTH-RECEIVING SURFACE OF THE IMAGE SENSOR WITH THE FIRST SIDE OF THE COLLIMATOR FACING AWAY FROM THE IMAGE SENSOR
1336

COLLIMATOR FOR UNDER-DISPLAY OPTICAL FINGERPRINT SENSING

BACKGROUND

Fingerprint sensing is becoming an increasingly common tool for authorizing (a) access to electronic devices, such as smartphones, (b) access to confidential electronic records, and (c) electronic transactions such as financial transactions carried out over the internet. Fingerprint sensing satisfies consumers' desire for an authentication mechanism that eliminates the need to enter (and remember) a pin code or other alphanumerical password, and also eliminates the need to keep track of multiple different pin codes/alphanumerical passwords associated with different devices and/or accounts. Fingerprint sensing is a well-established form a biometric identification, and optical fingerprint sensors have been used for years by, e.g., law enforcement agencies.

Several different types of fingerprint sensors have been designed for use in smartphones. Each of these types of fingerprint sensors images a finger to obtain the fingerprint. Some manufacturers supply ultrasound imagers and others capacitive sensors, but optical fingerprint sensors are emerging as a popular type of fingerprint sensor in smartphones at this time. In particular, a preferred implementation is now to position the optical fingerprint sensor underneath the smartphone display in order to accommodate the largest possible display. Such under-display implementations can use the display light to illuminate the finger and the optical fingerprint sensor then images the finger through the display.

A moiré pattern is an interference pattern between two (or more) similar ruled patterns overlaid on each other, wherein the two patterns are either slightly different or misaligned relative to each other. For example, a moiré pattern results if two identical ruled patterns are overlaid on each other with one ruled pattern being rotated relative to the other. Another common example is seen in a digital photo of a computer screen, in which case the moiré pattern results from the pixel array of the digital camera having a different pixel-to-pixel pitch than the pixel array of the computer screen (as imaged onto the pixel array of the digital camera).

SUMMARY

In an embodiment, a collimator for under-display fingerprint sensing includes (a) a substrate having opposite facing first and second sides, (b) an array of microlenses disposed on the first surface for focusing light from a fingerprint surface onto a focal plane that is between the array of microlenses and the second side of the substrate such that the light, as projected by the array of microlenses, is diverging when exiting the second side of the substrate, and (c) an array of apertures between the array of microlenses and the substrate, wherein each of the apertures is aligned to and cooperates with a respective one of the microlenses to form a field-of-view-limited lens having a field of view corresponding to a respective local portion of the fingerprint surface. The collimator may be included in an optical fingerprint imager that further includes an image sensor disposed on the second side of the substrate and including an array of photosensitive pixels for capturing an image of the light exiting the second side of the substrate.

In an embodiment, a method for manufacturing an optical fingerprint imager includes bonding a collimator to a light-receiving surface of an image sensor such that a footprint of the collimator on the image sensor is over at least a portion of a photosensitive pixel array of the image sensor while a plurality of electrical connection pads of the image sensor are outside the footprint, wherein the collimator includes an array of lenses each configured to collect light from a respective local portion of a fingerprint surface and project the light to the image sensor.

DESCRIPTION OF EXAMPLE EMBODIMENTS

Figure 1:
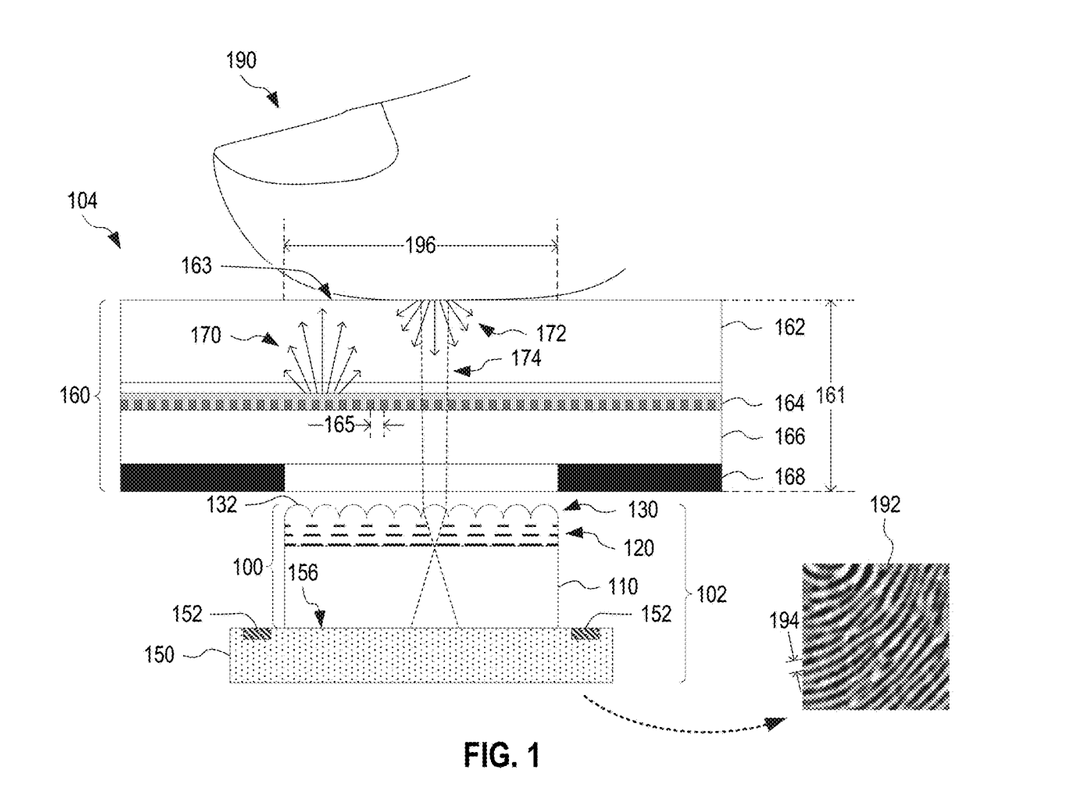
FIG. 1 illustrates a collimator for an under-display optical fingerprint sensor, according to an embodiment.

FIG. 1 illustrates, in cross-sectional view, one collimator 100 for under-display optical fingerprint sensing. FIG. 1 illustrates collimator 100 in an example use scenario. In this scenario, collimator 100 is mounted on an image sensor 150 to form a fingerprint imager 102. Fingerprint imager 102 is positioned underneath a display 160 of a device 104 such that fingerprint imager 102 can capture a fingerprint image 192 of a finger 190 positioned on a fingerprint surface 163. Fingerprint surface 163 is a portion of the top surface of display 160 that is located over fingerprint imager 102. Device 104 may be a smartphone or a tablet computer, and display 160 may a primary user-interface display thereof or a dedicated fingerprinting display. Image sensor 150 is, for example, a complementary metal oxide semiconductor (CMOS) image sensor, or a thin-film (TFT) sensor array.

In operation, display 160 emits light 170 toward fingerprint surface 163 to be scattered by finger 190. In one example, light 170 is in the visible wavelength range. Light 170 may be green light emitted by organic LEDs and thus be in the wavelength range between approximately 480 and 580 nanometers. Alternatively, light 170 may be cyan in color and include light in the wavelength range between approximately 430 and 580 nanometers. Collimator 100 collects a portion of light 172 that is scattered by finger 190 at fingerprint surface 163 and transmitted through the display 160 to collimator 100. Collimator 100 then projects the collected light 172 onto image sensor 150. Hypothetically, as an alternative to collimator 100, fingerprint imager 102 could include a conventional imaging lens. However, collimator 100 is well-suited for near-field imaging and allows for placement of fingerprint imager 102 close to display 160, thereby facilitating compactness of devices using fingerprint imager 102 as an under-display fingerprint imager. For example, display 160 may have thickness 161 in the range between 1.0 and 1.8 millimeters, in which case collimator 100 allows for placement of image sensor 150 with its light-receiving surface 156 less than approximately 2.0 millimeters from fingerprint surface 163, or even less than 500 microns, or even less than 200 microns, while being able to image a portion of fingerprint surface 163 approximately as wide as collimator 100 itself. Applications may require that the imageable area of fingerprint surface 163, as indicated by width 196, is between 0.5 and 4 centimeters (corresponding to width 196 being between 0.7 and 2 centimeters). A conventional imaging lens would require a significantly greater working distance to image an area of this size, which may not be compatible with the space constraints of such devices as smartphones and tablet computers.

Fingerprint identification is generally based on mapping of the ridge pattern in the fingerprint. The ridge-to-ridge spacing 194 tends to be in the range between 200 and 800 microns. However, fingerprint identification often relies on mapping of the merging and splitting of ridges, and fingerprint imaging therefore typically requires that fingerprint image 192 has a resolution of between 300 and 500 dots-per-inch (dpi) to sufficiently resolve the features of the fingerprint used for identification.

In FIG. 1, display 160 is depicted as including a substrate 166, an organic-light-emitting-diode (LED) layer 164 formed on the side of substrate 166 facing fingerprint surface 163, a cover 162 forming fingerprint surface 163, and an opaque backing 168 on the side of substrate 166 facing fingerprint imager 102. Opaque backing 168 forms a light-transmissive aperture over fingerprint imager 102. Without departing from the scope hereof, display 160 may have a different construction than depicted in FIG. 1 and for example include other or additional elements, such as touch screen functionality. Regardless of the detailed configuration of display 160, display 160 includes a pixelated patterned array (organic-LED layer 164 is one example of this pixelated patterned array). The light to be collected by the collimator 100 is transmitted through this pixelated patterned array, and superimposes a silhouette pattern on light 172 collected by collimator 100. The pitch of the pixelated patterned array, for example as indicated by pitch 165 in FIG. 1, is typically in the range between 40 and 75 microns. The spatial frequency of his silhouette pattern induced by the display is therefore sufficiently high to not directly interfere with the ability to produce fingerprint image 192 with 300-500 dpi resolution.

Collimator 100 may be provided as a standalone component configured to be mounted on an image sensor (for example provided by a third party) to form a fingerprint imager or another form of near-field imager. Similarly, fingerprint imager 102 may be provided as a standalone component configured to be positioned underneath a display provided by a third party, for example in a smartphone or in a tablet computer.

As will be discussed in further detail in the following, collimator 100 may provide certain advantages over other types of collimators. These advantages include manufacturing cost reduction, optical anti-aliasing, and suppression of moiré patterns in fingerprint image 192.

Collimator 100 includes a substrate 110, a microlens array 130, and an aperture array 120 disposed between microlens array 130 and substrate 110. Microlens array 130 includes an array of microlenses 132 that collect light from a scene, e.g., light 172 from fingerprint surface 163, and projects this light onto image sensor 150. Aperture array 120 restricts the light projected by each microlens 132 to a narrow field of view (FOV) 174, such that each microlens 132 projects, onto image sensor 150, light from only a respective local area of the fingerprint surface 163. Aperture array 120 essentially collimates the FOV of each microlens 132, so as to give collimator 100 imaging capability. Although for clarity not shown in FIG. 1, collimator 100 may include a wavelength filter configured to block near-infrared and other infrared light that would be present as ambient light and transmitted by a finger in a fingerprinting sensing scenario Image sensor 150 may include electrical connection pads 152 outside the footprint of collimator 100 on light-receiving surface 156. Electrical connection pads 152 are configured to accommodate electrical connections to other electronic circuitry external to image sensor 150. In an alternative embodiment, not depicted in FIG. 1, image sensor 150 includes through-silicon vias, and electrical connection pads are formed on the bottom side of image sensor 150 facing away from collimator 100.

Figure 2:
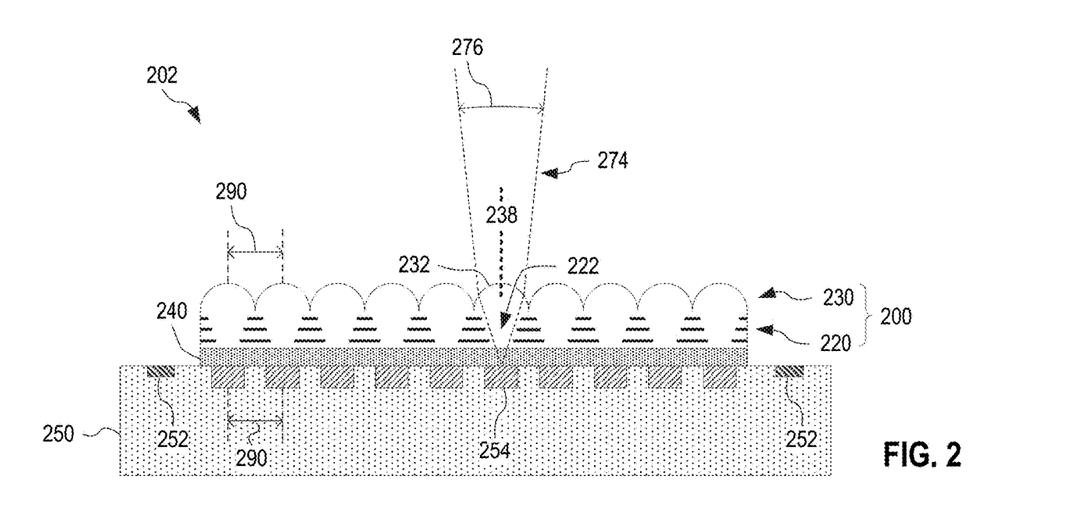
FIG. 2 illustrates an under-display fingerprint imager having an image sensor and a collimator that is formed directly on the image sensor and lacks the substrate of the collimator of FIG. 1.

FIG. 2 illustrates an under-display fingerprint imager 202 having an image sensor 250 and a collimator 200 that is formed directly on image sensor 250 and lacks substrate 110. Collimator 200 includes a microlens array 230 of microlenses 232, and an aperture array 220 forming apertures 222. Each aperture 222 is registered to the optical axis 238 of a respective one of microlenses 232, such that each microlens projects light from a narrow FOV 274, characterized by a FOV angle 276, toward image sensor 250. Fingerprint imager 202 further includes a wavelength filter 240 between collimator 200 and image sensor 250. Wavelength filter 240 blocks near-infrared and other infrared light that would be present as ambient light and transmitted by a finger in a fingerprinting sensing scenario.

Image sensor 250 includes an array of photosensitive pixels 254 and a plurality of electrical connection pads 252. The focal length of microlenses 232 is such that light projected by microlens array 230 is approximately focused on the light-receiving surface of image sensor 250. Microlens array 230 and aperture array 220 have identical pitch 290 and are registered to each other such that each microlens 232 focuses light onto a respective pixel 254. Electrical connection pads 252 are outside the footprint of collimator 200 and wavelength filter 240 on image sensor 250. Typically, pitch 290 is less than 30 microns, for example approximately 20 microns.

When fingerprint imager 202 is implemented below a display, such as display 160, light collected by collimator 200 has a silhouette pattern from the display superimposed thereon. This silhouette pattern is superimposed on the resolution of collimator 200 and the combination produces a moiré pattern. The moiré pattern may not be detrimental to the fingerprint image as long as the spatial frequencies of the moiré pattern are higher or lower than the resolution range required for fingerprint identification, e.g., between 300 and 60 dpi or greater than 500 dpi when the required fingerprint resolution is 300-500 dpi. Pitch 290 may be set such that the moiré pattern, resulting from the superposition of the display silhouette and the pitch of collimator 200 and pixels 254, has spatial frequencies that are outside the range of the fingerprint resolution requirement. In one example, it may be desirable to set the pitch of collimator 200 and pixels 254 such that the spatial frequencies of the moiré pattern are at least approximately 6.7 cycles per millimeter. However, in the interest of fast post-processing of captured fingerprint images and reducing data overhead, captured fingerprint images are often down-sampled from the native pixel resolution of image sensor 250 to a resolution that is sufficient to meet the requirement for fingerprint identification without being much higher. For example, pixels 254 may be binned in 3×3 pixel groups to make super-pixels that have a pitch of approximately 50 to 75 microns. This down-sampling process may lead to aliasing of the moiré pattern to lower spatial frequencies that interfere with the fingerprint identification. Thus, digital anti-alias filtering of the fingerprint images may be required to remove the down-sampled moiré pattern.

Figure 3:
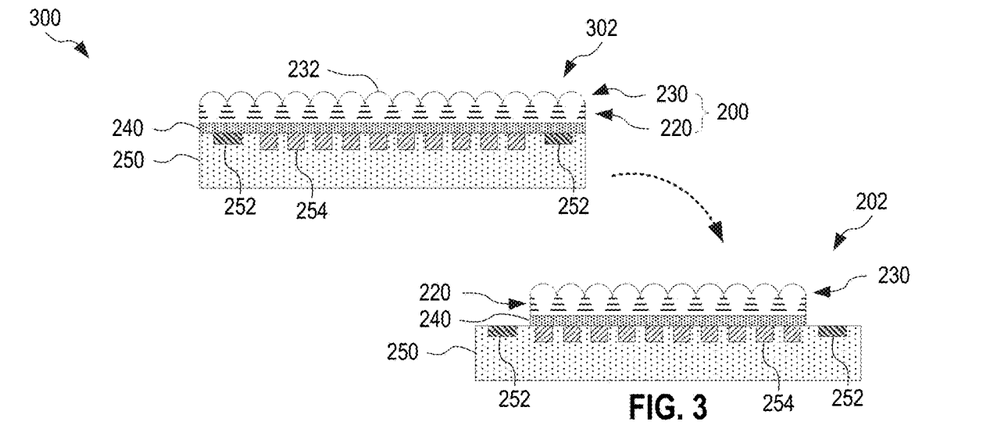
FIG. 3 illustrates a method for manufacturing the fingerprint imager of FIG. 2.

FIG. 3 illustrates a method 300 for manufacturing fingerprint imager 202. Method 300 first produces an assembly 302 wherein collimator 200 covers the entire top surface of image sensor 250 including the area over electrical connection pads 252. Assembly 302 may be formed in a wafer-level process, wherein (a) wavelength filter 240 is formed on the surface of a wafer (e.g., an 8-inch wafer) having many image sensors 250, (b) aperture array 220 and microlens array 230 are formed on wavelength filter 240 over the entire wafer, and (c) the wafer is diced to singulate a plurality of assemblies 302 therefrom. When forming aperture array 220 and microlens array 230 on the wafer, apertures 222 and microlenses 232 must be aligned to pixels 254 of each image sensor 250. At one step of the manufacturing process, the portion of collimator 200 covering electrical connection pads 252 may be removed in a pad clearing step. Method 300 thus has several potentially costly and/or challenging requirements including at least (i) accurate alignment of apertures 222 and microlenses 232 of collimator 200 to pixels 254 of each image sensor 250 and (ii) pad clearing. Any time collimator 200 fails to meet the manufacturing tolerance requirements, an associate image sensor 250 is lost as well. When an alignment error generally affects all of collimator 200 deposited on an image sensor wafer, the entire image sensor wafer is lost. The image sensors have relatively high value and any yield loss is therefore expensive.

Figure 4:
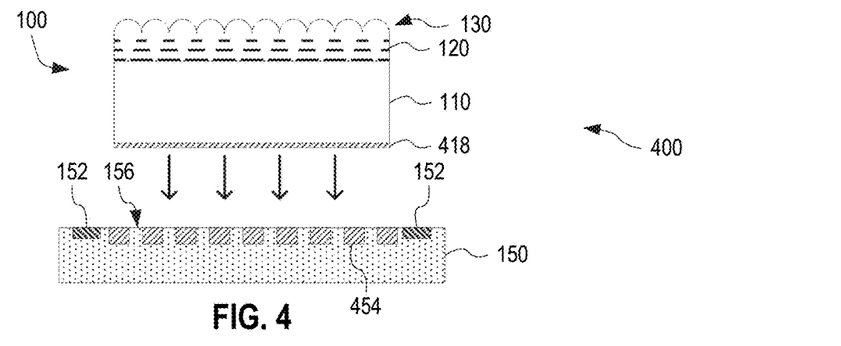
FIG. 4 illustrates a method for manufacturing the fingerprint imager of FIG. 1, according to an embodiment.

FIG. 4 illustrates one method 400 for manufacturing fingerprint imager 102. Method 400 includes bonding a pre-manufactured collimator 100 to light-receiving surface 156 of image sensor 150. Method 400 may utilize an adhesive 418 to bond collimator 100 to image sensor 150. Adhesive 418 may be first disposed on collimator 100 (as shown in FIG. 4) or first disposed on image sensor 150, prior to contacting collimator 100 to image sensor 150. Collimator 100 may be sized and positioned to only cover the active pixels 254 needed for imaging. As a result, for embodiments of fingerprint imager 102 including electrical connection pads 152 (as shown in FIG. 1), method 400 does not require a pad clearing step. In addition, as will be discussed in further detail below, fingerprint imager 102 does not rely on microlenses 132 of collimator 100 being registered to pixels of image sensor 150, which greatly relaxes the requirements for relative alignment between collimator 100 and image sensor 150 and therefore also eliminates or at least reduces the expensive yield loss associated with method 300. To further save cost, collimator 100 may be mass-manufactured at the wafer level or mass-manufactured in the form of sheets.

Whereas the image sensor provides the structural support for collimator 200 in method 300, substrate 110 can provide the structural support required to pre-manufacture collimator 100 for use in method 400. Referring again to FIG. 1, substrate 110 thus prevents microlenses 132 from focusing light 172 on light-receiving surface 156 of image sensor 150, and light 172 is instead diverging when incident on image sensor 150.

It is understood that, in each of FIGS. 1, 2, 3, and 4, the microlens arrays may have more microlenses than depicted, the aperture arrays may form more or fewer apertures than depicted, and the image sensors may include more pixels than depicted.

Figure 5:
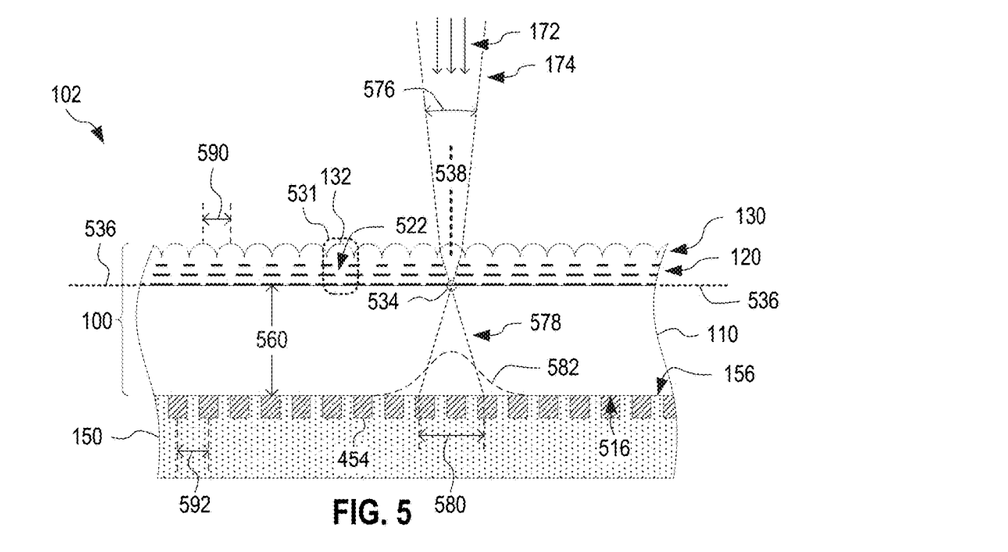
FIG. 5 shows the collimator of FIG. 1 in further detail, in an example scenario when bonded to the image sensor of FIG. 1, according to an embodiment.

FIG. 5 shows collimator 100 in further detail, in an example scenario when bonded to image sensor 150. Aperture array 220 forms a plurality of apertures 522. Each aperture 522 is aligned to the optical axis 538 of a respective one of microlenses 232. Each pair of aperture 522 and microlens 232 thus forms a FOV-limited lens 531 having narrow FOV 174 characterized by FOV angle 576. In an embodiment, FOV angle 576 spans at least from −1.5 to 1.5 degrees relative to optical axis 538, and no more than from −4.0 to 4.0 degrees relative to optical axis 538, such that the full span of FOV angle 576 is between 3 and 8 degrees. In certain embodiments, the full span of FOV angle 576 is between 3 and 10 degrees.

Lenses 531 have a pitch 590. Pitch 590 may be in the range between 10 and 35 microns, which is sufficiently small that any pattern superimposed on light 172 by the pixelated nature of microlens array 130 and aperture array 120 does not directly interfere with the ability to generate fingerprint image 192 having resolution within the 300-500 dpi range.

Whereas the focal plane of microlens array 230 of collimator 200 is at the light-receiving surface of image sensor 250, the focal plane 536 of microlens array 130 is inside collimator 100 between microlens array 130 and the surface 516 of substrate 110 facing away from microlens array 130. This a consequence of the presence of substrate 110 and the need for its thickness 560 to be sufficient to give substrate 110 the strength to function as a support for aperture array 120 and microlens array 130. In an embodiment, substrate 110 is made of glass or optical plastic and thickness 560 is in the range between 100 microns and 300 microns, while the focal length of each microlens 132 is in the range between 15 and 90 microns. As a result of focal plane 536 being inside collimator 100, light 172 is diverging and defocused when incident on image sensor 150 (as indicated by the projection 578 of FOV 174). The profile 582 of light 172 projected onto image sensor 150 by each microlens 132 may have a spot size 580 (e.g., full-width at half-maximum) in the range between 10 and 75 microns. These spot sizes can still allow fingerprint images 192 with the resolutions in the range needed for fingerprint identification (e.g. 300 dpi to 500 dpi). Further, the Gaussian-type shape of the spot's intensity profile can function as an anti-aliasing filter to eliminate aliasing of spatial frequencies that are greater than that of the final image (e.g. frequencies introduced as moiré patterns). This feature may allow the use of larger, or directly binned pixels in the image sensor at the final image resolution (e.g. 300-dpi).

While FIG. 5 shows focal plane 536 as coinciding with the interface between substrate 110 and aperture array 120, focal plane 536 may be elsewhere between microlens array 130 and surface 516, without departing from the scope hereof.

By virtue of the defocusing nature of collimator 100, it is not necessary, in fingerprint imager 102, that pixels 454 of image sensor 150 are registered to respective lenses 531. The pitch 592 of pixels 454 may be different from pitch 590, and pitch 592 may be as large as the resolution required for fingerprint identification and/or as large as spot size 580. In one embodiment, pitch 592 is in the range between approximately 10 and approximately 75 microns, wherein the 75-micron limit is imposed by the resolution requirement for fingerprint images.

Since pitch 592 and pitch 590 do not need to be identical, any given embodiment of collimator 100 may be used on a variety of embodiments of image sensor 150. It is not necessary to design collimator 100 specifically according to the pixel pitch of a chosen embodiment of image sensor 150, and, vice versa, it is not necessary to select or design an embodiment of image sensor 150 with a pixel pitch that specifically matches a chosen embodiment of collimator 100. Hence, collimator 100 is well-suited for being provided as a stand-alone item to be integrated with any one of many different image sensors to form an embodiment of fingerprint imager 102. For example, a smartphone manufacturer may select and purchase collimator 100 and image sensor 150 separately from each other with no requirement that pitch 592 equals pitch 590. In addition, the size of collimator 100 does not need to match the size of the array of pixels 454 of image sensor 150, as long as collimator 100 covers the desired optical input area. As a result, it is possible to make collimator 100 small and thus save manufacturing cost. In addition, when placed on an embodiment of image sensor 150 having top-side electrical connection pads 152, collimator 100 may be sized to not cover electrical connection pads 152. Furthermore, as discussed in further detail below in reference to FIG. 11, collimator 100 may be rotated relative to the array of pixels 454 of image sensor 150. Such rotation, made possible by the fact that pixels 454 do not need to be registered to lenses 531, may further help suppress moiré patterns in fingerprint image 192.

Figure 6:
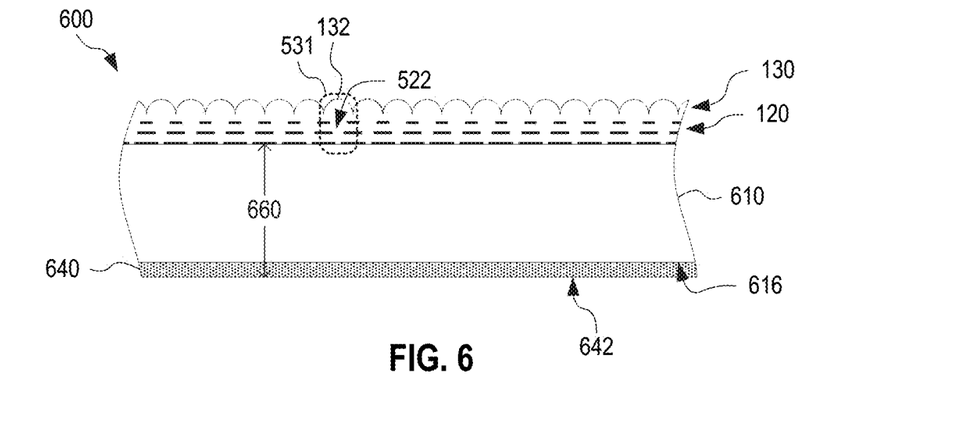
FIGS. 6, 7, and 8 illustrate respective embodiments of a collimator that includes a wavelength filter.
Figure 7:
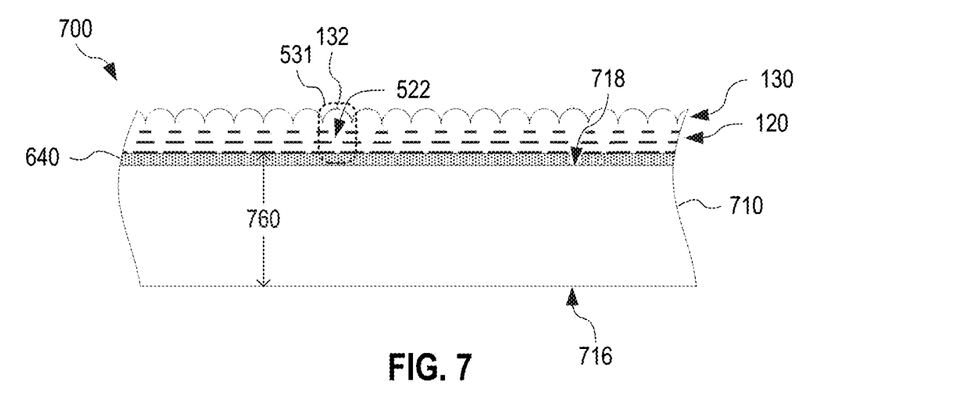
Figure 8:
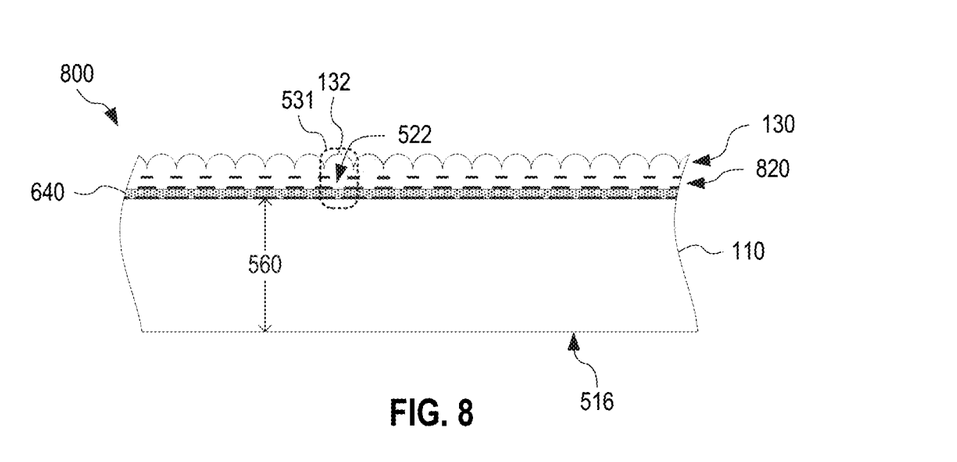

FIGS. 6, 7, and 8 illustrate collimators 600, 700, and 800, respectively, each including a wavelength filter 640 that blocks near-infrared and other infrared light that would be present as ambient light and transmitted through a finger in a fingerprinting sensing scenario. Wavelength filter 640 may block wavelengths that exceed approximately 800 nanometers, or exceed 580 nanometers. Wavelength filter 640 may be a multi-layer cut-off filter. Collimators 600, 700, and 800 differ from each other in the placement of wavelength filter 640. Collimators 600, 700, and 800 are embodiments of collimator 100.

In collimator 600, wavelength filter 640 is disposed on a surface 616 of a substrate 610. Substrate 610 is an embodiment of substrate 110, and surface 616 is an embodiment of surface 516. A bottom surface 642 of wavelength filter 640 may be bonded to light-receiving surface 156, as discussed above in reference to FIG. 4, to form an embodiment of fingerprint imager 102. The combined thickness 660 of substrate 610 and wavelength filter 640 may be in the range between 50 and 300 microns.

In collimator 700, wavelength filter 640 is disposed on a surface 718 of a substrate 710 between substrate 710 and aperture array 120. Substrate 710 is an embodiment of substrate 110 that has opposite-facing surfaces 716 and 718. Surface 716 is an embodiment of surface 516. Surface 716 may be bonded to light-receiving surface 156, as discussed above in reference to FIG. 4, to form an embodiment of fingerprint imager 102. The combined thickness 760 of substrate 710 and wavelength filter 640 may be in the range between 50 and 300 microns.

In collimator 800, wavelength filter 640 is integrated in an aperture array 820. Aperture array 820 is an embodiment of aperture array 120. Aperture array 820 may implement wavelength filter 640 where aperture array 820 meets substrate 110 (as shown in FIG. 8), where aperture array 820 meets microlens array 130, throughout the thickness of aperture array 820 between substrate 110 and microlens array 130, or in an interior portion of aperture array 820 between substrate 110 and microlens array 130.

Figure 9:
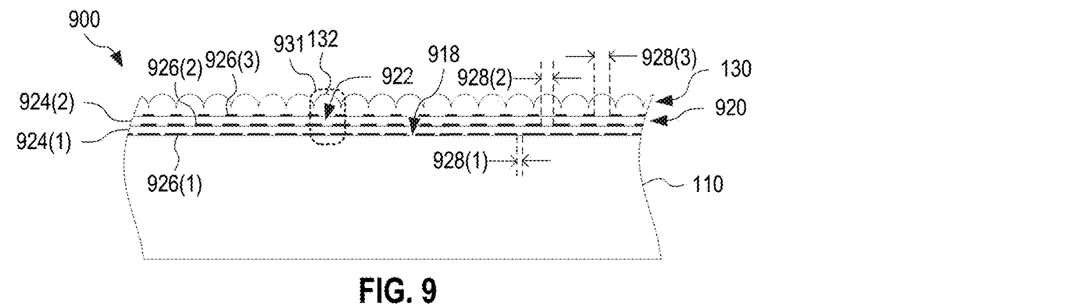
FIG. 9 illustrates a collimator having a multi-layered aperture array, according to an embodiment.

FIG. 9 illustrates one collimator 900 having a multi-layered aperture array 920. Collimator 900 is an embodiment of collimator 100, and aperture array 920 is an embodiment of aperture array 120. Aperture array 920 includes at least two aperture-array layers 926 and at least one spacer-material layer 924. From a top surface 918 of substrate 110 to microlens array 130, aperture array 920 alternates between aperture-array layers 926 and spacer-material layers 924. In the example depicted in FIG. 9, aperture array 920 has three aperture-array layers 926(1), 926(2), and 926(3) and two spacer-material layers 924(1) and 924(2). Each aperture-array layer 926 includes an opaque material that forms a plurality of apertures characterized by a diameter 928. The aperture-array layer 926 closest to substrate 110 (in the FIG. 9 example, aperture-array layer 926) has the smallest aperture diameter 928. Each subsequent aperture-array layer 926 stacked thereon has an aperture diameter 928 that is larger than the aperture diameter 928 of preceding aperture-array layers. In the FIG. 9 example, aperture-array layers 926(1), 926(2), and 926(3) have respective aperture diameters 928(1), 928(2), and 928(3), wherein aperture diameter 928(2) is larger than aperture diameter 928(1) and aperture diameter 928(3) is larger than aperture diameter 928(2). Underneath each microlens 132, the stack of apertures formed by aperture-array layers 926 cooperate to form an aperture structure 922. Aperture structure 922 cooperates with microlens 132 to form a FOV-limited lens 931. Aperture structure 922 and FOV-limited lens 931 are embodiments of aperture 122 and FOV-limited lens 531, respectively. Each aperture of the bottom aperture layer (e.g., aperture layer 924(1)) cooperates with a corresponding microlens 132 to establish the primary FOV of FOV-limited lens 931. Each aperture of the top aperture layer (e.g., aperture layer 924(3)) cooperates with the corresponding microlens 132 to establish the numerical aperture of FOV-limited lens 931. The numerical aperture helps define the divergence angle of the light when propagating through substrate 110 (see projection 578 in FIG. 5). Apertures of any aperture layers between the top and bottom aperture layers (e.g., apertures of aperture layer 924(2)) help eliminate any secondary light outside the FOV.

Wavelength filter 640 may be implemented in one or more spacer-material layers 924 to form an embodiment of collimator 800. Embodiments of aperture array 920 that do not include wavelength filter 640 may be implemented in either one of collimator 600 and 700.

Aperture array 920 may be manufactured by alternatingly depositing (a) an opaque material to form an aperture-array layer 926 and (b) a non-opaque material to form a spacer-material layer 924.

Figure 10:
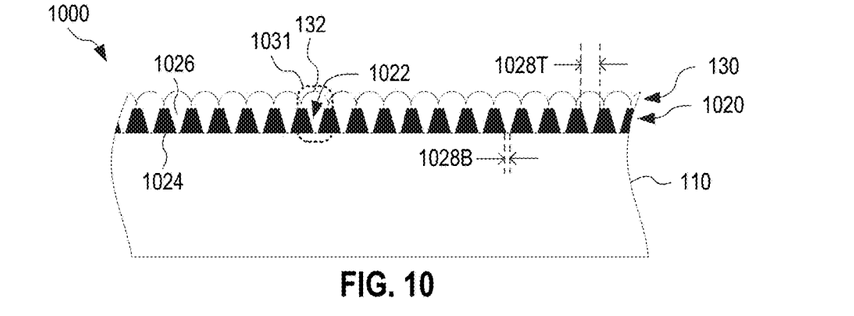
FIG. 10 illustrates a collimator having a single-layer tapered aperture array, according to an embodiment.

FIG. 10 illustrates one collimator 1000 having a single-layer tapered aperture array 1020. Collimator 1000 is an embodiment of collimator 100, and aperture array 1020 is an embodiment of aperture array 120. Aperture array 1020 includes an opaque material 1024 forming an array of conical apertures 1022. Each conical aperture 1022 tapers from a maximum diameter 1028T at its top (nearest microlens array 130) to a minimum diameter 1028B at its bottom (nearest substrate 110). Each aperture 1022 cooperates with a respective microlens 132 to form a FOV-limited lens 1031. FOV-limited lens 1031 is an embodiment of FOV-limited lens 531.

Each aperture 1022 may be filled by a non-opaque material 1026. In one embodiment, material 1026 is the same as the material of microlens array 130, in which case material 1026 may be deposited in apertures 1022 as part of a deposition (e.g., molding) process to form microlens array 130 over opaque material 1024. In another embodiment, material 1026 is different from the material of microlens array 130.

Aperture array 1022 may be implemented in either one of collimators 600 and 700. Aperture array 1022 may also be implemented in collimator 800, although the process to form wavelength filter 640 (as part or all of non-opaque material 1026) in aperture array 1022 may be more complex due to the presence of opaque material 1024.

Figure 11:
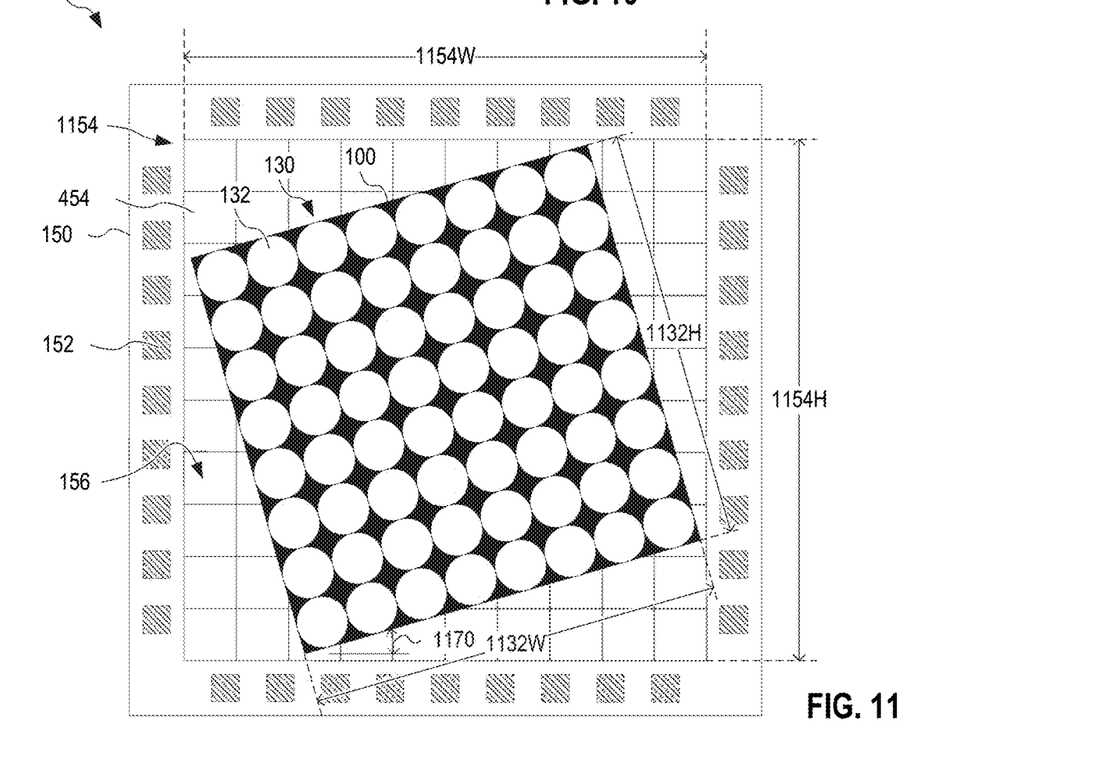
FIG. 11 illustrates a fingerprint imager where a collimator is at an angle to an array of pixels of an image sensor, according to an embodiment.

FIG. 11 illustrates, in top plan view, one fingerprint imager 1102 where collimator 100 is at an angle 1170 to the array of pixels 454, i.e., pixel array 1154, of image sensor 150. Fingerprint imager 1102 is an embodiment of fingerprint imager 102. When angle 1170 is zero (or divisible by 90 degrees), pixel array 1154 is square with microlens array 130 of collimator 100. However, in certain embodiments, angle 1170 is oblique. Such embodiments may help suppress moiré patterns in fingerprint image 192. The optimal value of angle 1170 for suppressing moiré patterns depends at least on pitches 590 and 592, and the pitch of the display silhouette pattern as well as the angles between these elements. In one example that has been found to suppress moiré patterns, pitch 590 is between 10 and 35 microns, pitch 592 is 21.5 microns, and angle 1170 is between 7.5 and 10.5 degrees.

Pixel array 1154 has width 1154W and height 1154H, both of which may be greater than 3.5 millimeters. Pixel array 1154 may be square or oblong. Collimator 100 has width 1132W and height 1132H, both of which may be greater than 3.5 millimeters. Collimator 100 may be square or oblong. Without departing from the scope hereof, microlens array 130 may include more microlenses 132 than depicted in FIG. 11, and pixel array 1154 may include more pixels 454 than depicted in FIG. 11. In fingerprint imager 1102, the footprint of collimator 100 on image sensor 150 is within the area of light-receiving surface 156. As a result, when image sensor 150 includes top-side electrical connection pads 152, these are not covered by collimator 100, such that electrical connection pads 152 is not covered by collimator 100. Without departing from the scope hereof, the footprint of collimator 100 may extend beyond pixel array 1154, as long as collimator 100 does not cover electrical connection pads 152 needed for operation of image sensor 150.

Figure 12:
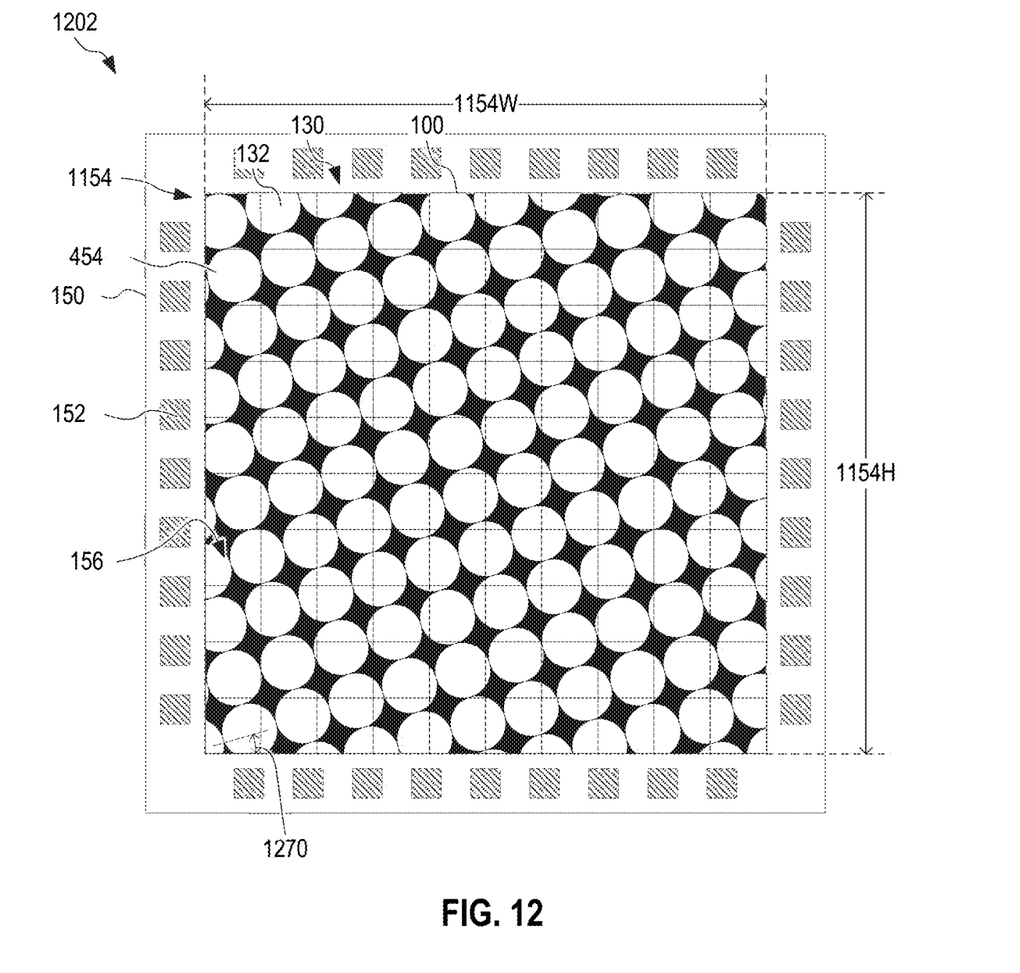
FIG. 12 illustrates a fingerprint imager where a collimator is square with a pixel array but a microlens array of the collimator is at an oblique angle with the pixel array, according to an embodiment.

FIG. 12 illustrates, in top plan view, one fingerprint imager 1202 where collimator 100 is square with pixel array 1154 of image sensor 150, but microlens array 130 is at an oblique angle 1270 with pixel array 1154. Fingerprint imager 1202 is a modification of fingerprint imager 1102 wherein collimator 100 is sized to match width 1154W and height 1154H of pixel array 1154. Angle 1270 is for example between 7.5 and 10.5 degrees.

Figure 13:
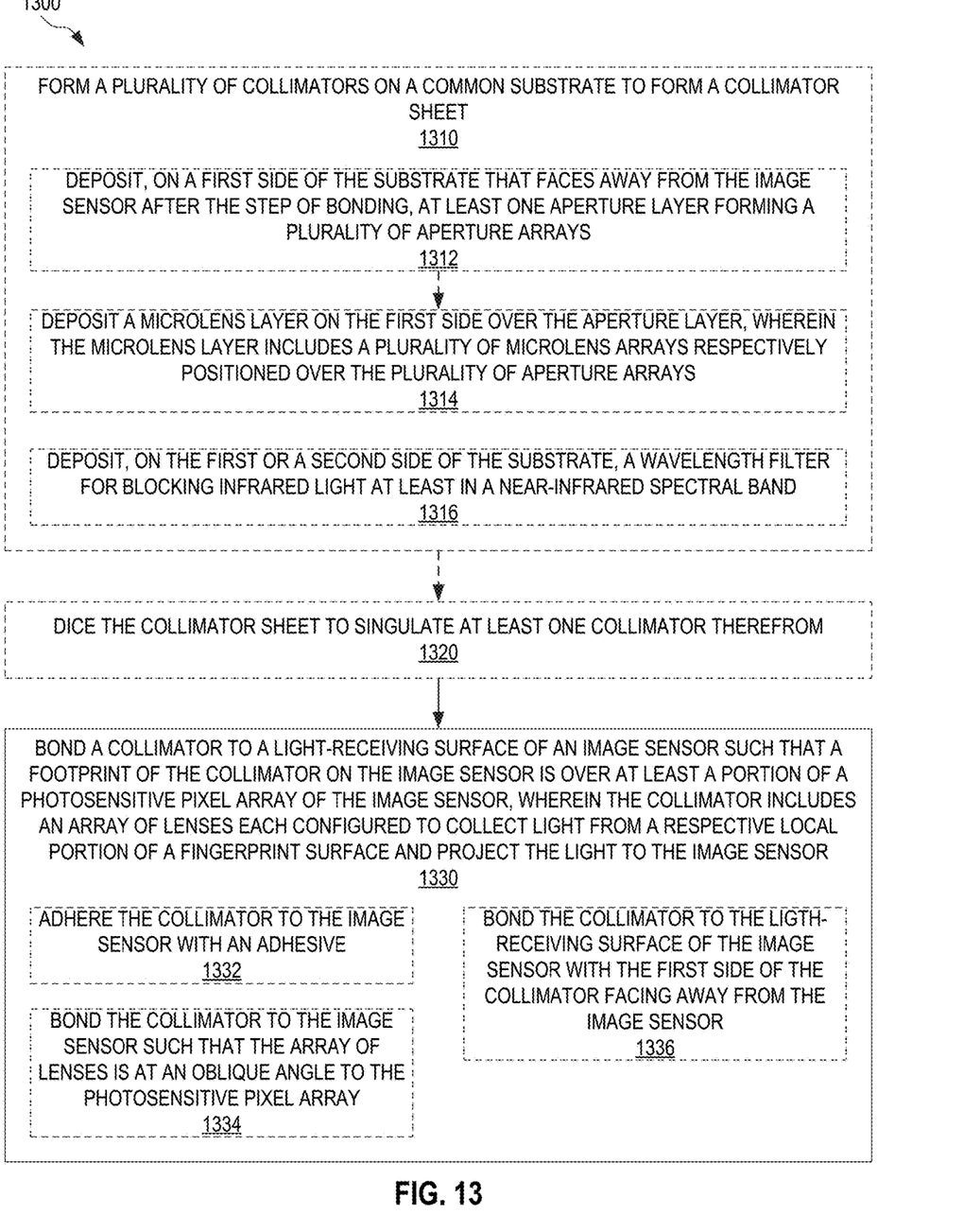
FIG. 13 illustrates a method for manufacturing an optical fingerprint imager, according to an embodiment.

FIG. 13 illustrates one method 1300 for manufacturing an optical fingerprint imager. Method 1300 may be used to manufacture fingerprint imager 102. Method 1300 includes a step 1330 of bonding a collimator to a light-receiving surface of an image sensor such that a footprint of the collimator on the image sensor is over at least a portion of a photosensitive pixel array of the image sensor while a plurality of electrical connection pads of the image sensor are outside the footprint. The collimator includes an array of lenses each configured to collect light from a respective local portion of a fingerprint surface and project the light to the image sensor. In one example of step 1330, collimator 100 (including the array of FOV-limited lenses 531) is bonded to light-receiving surface 156 of image sensor as depicted in FIG. 4, and with collimator 100 positioned on image sensor 150 as depicted in FIG. 11 or in FIG. 12. Step 1330 may include a step 1332 of using an adhesive, such as adhesive 418) to adhere the collimator to the light-receiving surface of the image sensor. Step 1330 may also include a step 1334 of bonding the collimator to the image sensor such that the array of lenses is at an oblique to the pixel array of the image sensor. In one example of step 1334, collimator 100 is bonded to image sensor 150 such that angle 1170 is oblique (as depicted in FIGS. 11 and 12, for example). Alternatively, step 1330 bonds the collimator to the image sensor such that the array of lenses is square to the pixel array of the image sensor (e.g., with angle 1170 being zero or divisible by 90 degrees).

In certain embodiments, method 1300 further includes steps 1310 and 1320 preceding step 1330. Step 1310 forms a plurality of collimators on a common substrate to produce a collimator sheet, and step 1320 dices the collimator sheet to singulate at least one collimator therefrom. Step 1330 then uses this singulated collimator to form the fingerprint imager.

Figure 14:
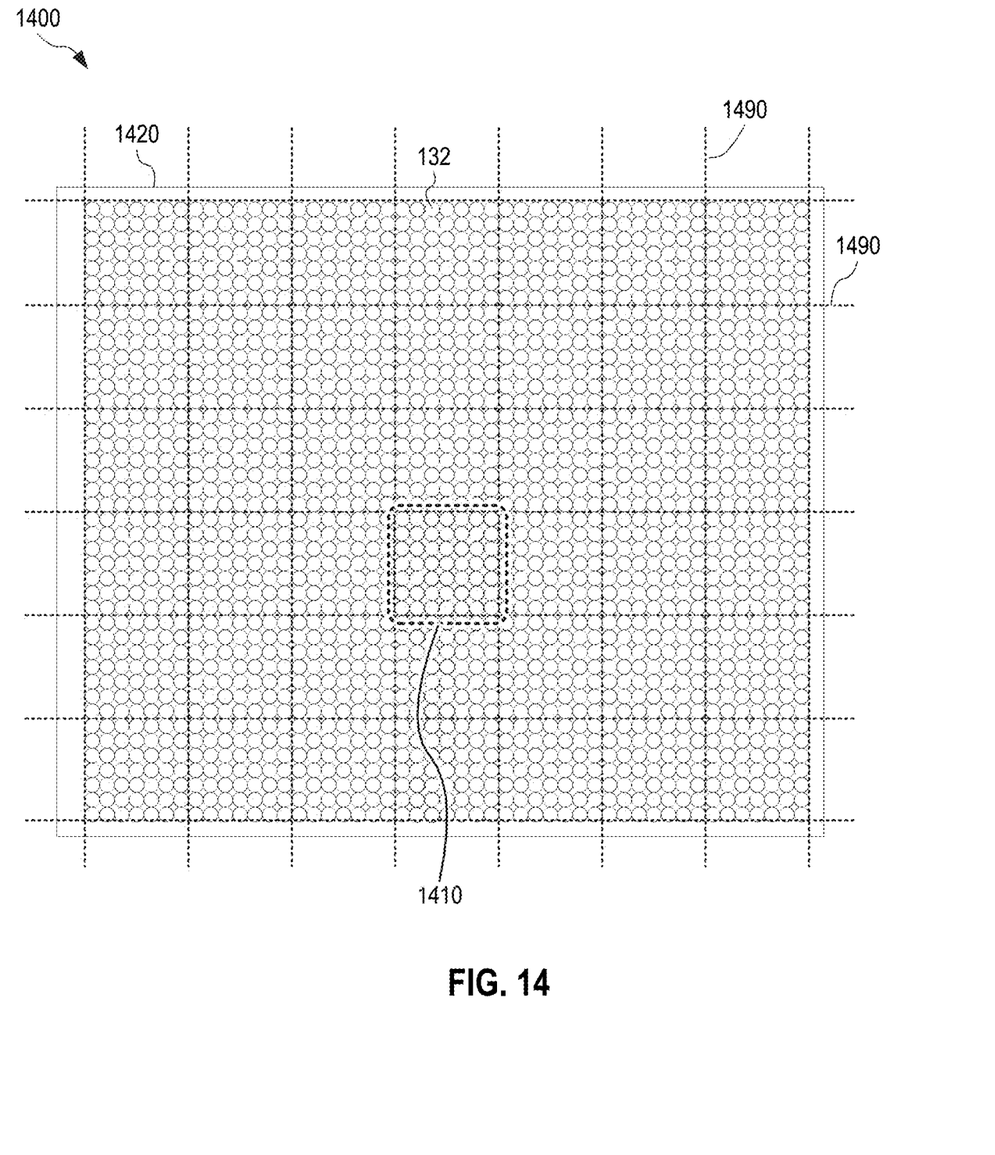
FIG. 14 shows a uniform collimator sheet, according to an embodiment.

FIG. 14 shows one example of a collimator sheet formed in step 1310, namely a collimator sheet 1400. Collimator sheet 1400 includes a common substrate 1420 supporting an array of microlenses 132 and an array of apertures between microlenses 132 and substrate 1420. The array of apertures is, for clarity of illustration, not indicated in FIG. 14. Collimator sheet 1400 is diced along dicing lines 1490 to singulate therefrom at least one collimator 1410 (an example of collimator 100). The array of microlenses 132 and the corresponding array of apertures have uniform density. As a result, dicing lines 1490 may be repositioned according to the desired size of collimator 1410 without having to custom-design collimator sheet 1400. Collimator sheet 1400 may be rectangular as shown in FIG. 14, or be in the form of a circular wafer. Dicing lines 1490 may be at an oblique angle to the array of microlenses 132 in collimator sheet 1400, for example to produce the example of collimator 100 depicted in FIG. 12.

Figure 15:
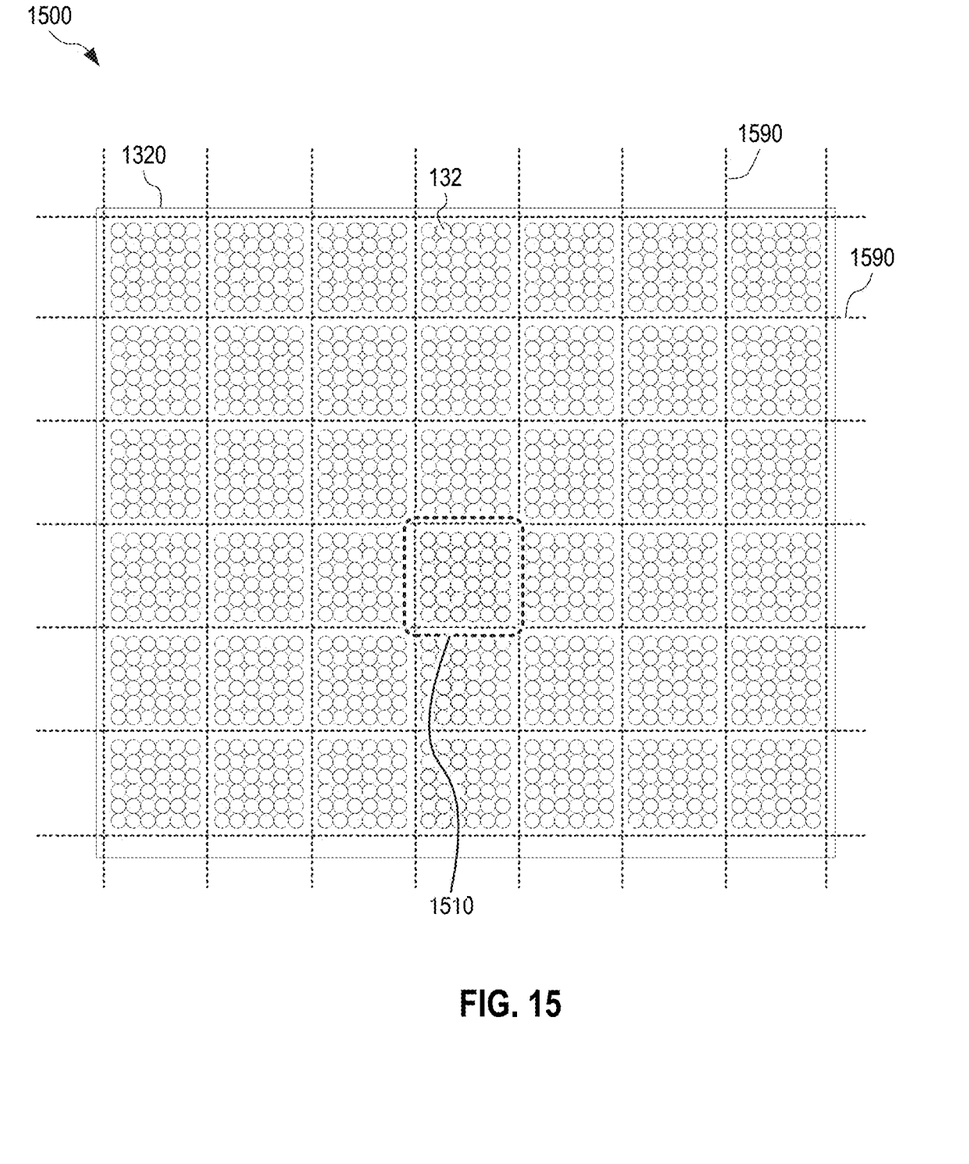
FIG. 15 shows a non-uniform collimator sheet, according to an embodiment.

FIG. 15 shows another example of a collimator sheet formed in step 1310, namely a collimator sheet 1500. Collimator sheet 1500 is similar to collimator sheet 1400 except for microlenses 132 (and associated apertures) being formed in groups that match a desired size of the collimators 1510 singulated from collimator sheet 1500 when diced along dicing lines 1590. Collimator sheet 1500 may be rectangular as shown in FIG. 15, or be in the form of a circular wafer.

In an embodiment, step 1310 includes steps 1312 and 1314. Step 1312 deposits, on a first side of the substrate that faces away from the image sensor after step 1330, at least one aperture layer forming a plurality of aperture arrays. In one example of step 1312, an extended version of aperture array 120 is formed on one side of common substrate 1320, either in a uniform manner as indicated by the position of microlenses 132 in FIG. 14 or in a non-uniform manner as indicated by the position of microlenses 132 in FIG. 15. Step 1314 deposits a microlens layer on the first side over the aperture layer. The microlens layer includes a plurality of microlens arrays respectively positioned over the plurality of aperture arrays. In one example of step 1314, an extended version of microlens array 130 is formed over the aperture layer (formed in step 1312), either in a uniform manner as indicated by microlenses 132 in FIG. 14 or in a non-uniform manner as indicated by the position of microlenses 132 in FIG. 15.

Step 1310 may further include a step 1316 of depositing, on the first side of the common substrate or on a second opposite-facing side of the common substrate, a wavelength filter for blocking infrared light at least in a near-infrared spectral band. In one example of step 1316, an extended version of wavelength filter 640 is formed on either one of the two sides of substrate 1420, such that collimators singulated therefrom form embodiments of any one of collimators 600, 700, and 800.

Combinations of Features

Features described above as well as those claimed below may be combined in various ways without departing from the scope hereof. For example, it will be appreciated that aspects of one collimator or associated method or device, described herein, may incorporate features or swap features of another collimator or associated method or device described herein. The following examples illustrate some possible, non-limiting combinations of embodiments described above. It should be clear that many other changes and modifications may be made to the methods, products, and systems herein without departing from the spirit and scope of this invention:

(A1) One collimator for under-display fingerprint sensing includes (a) a substrate having opposite facing first and second sides, (b) an array of microlenses disposed on the first surface for focusing light from a fingerprint surface onto a focal plane that is between the array of microlenses and the second side of the substrate such that the light, as projected by the array of microlenses, is diverging when exiting the second side of the substrate, and (c) an array of apertures between the array of microlenses and the substrate, wherein each of the apertures is aligned to and cooperates with a respective one of the microlenses to form a field-of-view-limited lens having a field of view corresponding to a respective local portion of the fingerprint surface.

(A2) In the collimator denoted as (A1), thickness of the substrate between the first and second sides may be at least 50 microns.

(A3) In the collimator denoted as (A2), the thickness may be no greater than 300 microns.

(A4) In either of the collimators denoted as (A2) and (A3), the focal length of each of the microlenses may be between 15 and 90 microns.

(A5) In any of the collimators denoted as (A1) through (A4), the field of view may span at least from −1.0 degrees to +1.0 degrees, relative to the optical axis of the field-of-view limited lens, and no more than from −5 degrees to +5 degrees, relative to the optical axis of the field-of-view limited lens.

(A6) In any of the collimators denoted as (A1) through (A5), the pitch of the array of microlenses may be between 10 and 35 microns.

(A7) In any of the collimators denoted as (A1) through (A6), the substrate may be transmissive at least to light having wavelength between 430 and 580 nanometers, and the collimator may further include a wavelength filter for blocking infrared light at least in a near-infrared spectral band.

(A8) One optical fingerprint imager includes any one of the collimators denoted as (A1) through (A7), and an image sensor that is disposed on the second side of the substrate and including an array of photosensitive pixels for capturing an image of the light exiting the second side of the substrate.

(A9) In the optical fingerprint imager denoted as (A8), the image sensor may have a light-receiving surface that faces the collimator and includes electrical connection pads, wherein the surface area of the light-receiving surface exceeds the footprint of the collimator on the image sensor and the electrical connection pads are outside the footprint.

(A10) Either of the optical fingerprint imagers denoted as (A8) and (A9) may further include an adhesive bonding the collimator to the light-receiving surface.

(A11) In any of the optical fingerprint imager denoted as (A8) through (A10), the pitch of the array of photosensitive pixels may be no greater than 75 microns.

(A12) In any of the optical fingerprint imagers denoted as (A8) through (A11), the array of photosensitive pixels may be rotated, relative to the array of microlenses, by an oblique rotation angle.

(A13) In any of the optical fingerprint imagers denoted as (A8) through (A13), the pitch of the array of photosensitive pixels may be different from pitch of the array of microlenses.

(B1) One method for manufacturing an optical fingerprint imager includes bonding a collimator to a light-receiving surface of an image sensor such that a footprint of the collimator on the image sensor is over at least a portion of a photosensitive pixel array of the image sensor. The collimator includes an array of lenses each configured to collect light from a respective local portion of a fingerprint surface and project the light to the image sensor.

(B2) The method denoted as (B1) may further include, before the step of bonding, forming a plurality of collimators on a common substrate to produce a collimator sheet, and dicing the collimator sheet to singulate the collimators therefrom, wherein the collimator used in the step of bonding is one of the collimators singulated in the step of dicing.

(B3) The method denoted as (B2) may include (a) in the step of forming, (i) depositing, on a first side of the common substrate that faces away from the image sensor after the step of bonding, at least one aperture layer forming a plurality of aperture arrays, and (ii) after the step of depositing at least one aperture layer, depositing a microlens layer on the first side over the aperture layer, the microlens layer including a plurality of microlens arrays respectively positioned over the plurality of aperture arrays, and (b) in the step of bonding, bonding the collimator to the light-receiving surface of the image sensor with the first side of the collimator facing away from the image sensor.

(B4) In the method denoted as (B3), the step of forming may further include depositing, on the first or a second side of the common substrate, a wavelength filter for blocking infrared light at least in a near-infrared spectral band.

(B5) In any of the methods denoted as (B1) through (B3), the collimator may include a wavelength filter for blocking infrared light at least in a near-infrared spectral band.

(B6) In any of the methods denoted as (B1) through (B5), the step of bonding may include bonding the collimator to the image sensor such that the array of lenses is at an oblique angle to the photosensitive pixel array.

Changes may be made in the above systems and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present systems and methods, which, as a matter of language, might be said to fall therebetween.

What is claimed is:

1. A collimator for under-display fingerprint sensing, comprising:
   a substrate having opposite facing first and second sides;
   an array of microlenses disposed on the first surface for focusing light from a fingerprint surface onto a focal plane that is between the array of microlenses and the second side of the substrate such that the light, as projected by the array of microlenses, is diverging when exiting the second side of the substrate; and
   an array of apertures between the array of microlenses and the substrate, each of the apertures aligned to and cooperating with a respective one of the microlenses to form a field-of-view-limited lens having a field of view corresponding to a respective local portion of the fingerprint surface.

2. The collimator of claim 1, thickness of the substrate between the first and second sides being at least 50 microns.

3. The collimator of claim 2, the thickness being no greater than 300 microns.

4. The collimator of claim 2, focal length of each of the microlenses being between 15 and 90 microns.

5. The collimator of claim 1, the field of view spanning at least from −1.0 degrees to +1.0 degrees, relative to an optical axis of the field-of-view limited lens, and no more than from −5 degrees to +5 degrees, relative to the optical axis of the field-of-view limited lens.

6. The collimator of claim 1, pitch of the array of microlenses being between 10 and 35 microns.

7. The collimator of claim 1, the substrate being transmissive at least to light having wavelength between 430 and 580 nanometers, the collimator further comprising a wavelength filter for blocking infrared light at least in a near-infrared spectral band.

8. An optical fingerprint imager, comprising:
   the collimator of claim 1; and
   an image sensor disposed on the second side of the substrate and including an array of photosensitive pixels for capturing an image of the light exiting the second side of the substrate.

9. The optical fingerprint imager of claim 8, the image sensor having a light-receiving surface that faces the collimator and includes electrical connection pads, surface area of the light-receiving surface exceeding footprint of the collimator on the image sensor, the electrical connection pads being outside the footprint.

10. The optical fingerprint imager of claim 8, further including an adhesive bonding the collimator to the light-receiving surface.

11. The optical fingerprint imager of claim 8, pitch of the array of photosensitive pixels being no greater than 75 microns.

12. The optical fingerprint imager of claim 8, the array of photosensitive pixels being rotated, relative to the array of microlenses, by an oblique rotation angle.

13. The optical fingerprint imager of claim 8, pitch of the array of photosensitive pixels being different from pitch of the array of microlenses.

14. A method for manufacturing an optical fingerprint imager, comprising:
   forming a plurality of collimators on a common substrate to produce a collimator sheet, and dicing the collimator sheet to singulate the collimators therefrom;
   bonding one of the singulated collimators to a light-receiving surface of an image sensor such that a footprint of the collimator on the image sensor is over at least a portion of a photosensitive pixel array of the image sensor, the collimator including an array of lenses each configured to collect light from a respective local portion of a fingerprint surface and project the light to the image sensor.

15. The method of claim 14, comprising:
   in the step of forming:
      depositing, on a first side of the common substrate that faces away from the image sensor after the step of bonding, at least one aperture layer forming a plurality of aperture arrays, and
      after the step of depositing at least one aperture layer, depositing a microlens layer on the first side over the aperture layer, the microlens layer including a plurality of microlens arrays respectively positioned over the plurality of aperture arrays; and
   in the step of bonding, bonding the collimator to the light-receiving surface of the image sensor with the first side of the collimator facing away from the image sensor.

16. The method of claim 15, the step of forming further comprising depositing, on the first or a second side of the common substrate, a wavelength filter for blocking infrared light at least in a near-infrared spectral band.

17. The method of claim 14, the collimator including a wavelength filter for blocking infrared light at least in a near-infrared spectral band.

18. The method of claim 14, the step of bonding including bonding the collimator to the image sensor such that the array of lenses is at an oblique angle to the photosensitive pixel array.

* * * * *